US008573987B1

(12) United States Patent
Schweitzer et al.

(10) Patent No.: US 8,573,987 B1
(45) Date of Patent: Nov. 5, 2013

(54) POWER DISTRIBUTION BOX ASSEMBLY

(75) Inventors: Brian C. Schweitzer, Plymouth, MI (US); Joseph A. Mauney, South Lyon, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 13/454,705

(22) Filed: Apr. 24, 2012

(51) Int. Cl.
*H01R 12/00* (2006.01)

(52) U.S. Cl.
USPC .................................. 439/76.2; 439/457

(58) Field of Classification Search
USPC ........ 439/76.2, 251, 449, 452, 457, 459, 470, 439/949
See application file for complete search history.

(56) References Cited

U.S. PATENT DOCUMENTS

| | | | | |
|---|---|---|---|---|
| 4,255,009 A | * | 3/1981 | Clark | 439/398 |
| 4,583,813 A | * | 4/1986 | Yamada | 439/345 |
| 4,653,831 A | | 3/1987 | Wilson et al. | |
| 5,073,126 A | * | 12/1991 | Kikuchi et al. | 439/452 |
| 6,297,447 B1 | | 10/2001 | Burnett et al. | |
| 6,462,276 B2 | | 10/2002 | Shimizu et al. | |
| 6,796,722 B2 | | 9/2004 | Mleczko | |
| 7,131,858 B1 | | 11/2006 | Zerebilov | |
| 7,228,625 B1 | | 6/2007 | Zerebilov | |
| 7,364,449 B2 | * | 4/2008 | Makino | 439/212 |
| 7,371,080 B1 | * | 5/2008 | Masters et al. | 439/76.2 |
| 7,381,072 B2 | | 6/2008 | Nagano | |
| 7,499,262 B1 | * | 3/2009 | Darr | 361/626 |
| 7,594,821 B1 | | 9/2009 | Hasija et al. | |
| 7,597,580 B1 | | 10/2009 | Advey et al. | |
| 2002/0025716 A1 | | 2/2002 | Kondo | |
| 2006/0223360 A1 | | 10/2006 | Chiba et al. | |

* cited by examiner

*Primary Examiner* — Neil Abrams
*Assistant Examiner* — Travis Chambers
(74) *Attorney, Agent, or Firm* — Harness, Dickey & Pierce, P.L.C.

(57) ABSTRACT

A power distribution box assembly having a power distribution box, a plurality of wire assemblies, a holder and a plurality of sets of resilient fingers. The power distribution box having a housing, which defines a plurality of terminal cavities, and a plurality of conductive busbars, each of which terminating at a busbar terminal that is received in a corresponding one of the terminal cavities. The wire assemblies are coupled to the busbar terminals and extending from a rear side of the housing. The holder is received in the rear side of the housing and engaged to the housing in a snap-fit manner. The holder has a plurality of wire channels, each of which receiving an associated one of the wires. Each set of resilient fingers has at least one finger that is resiliently coupled to the holder and configured to engage an associated one of the wires.

11 Claims, 3 Drawing Sheets

POWER DISTRIBUTION BOX ASSEMBLY

FIELD

The present disclosure relates to a power distribution box assembly.

BACKGROUND

This section provides background information related to the present disclosure which is not necessarily prior art.

Power distribution boxes are often used in vehicles to connect battery power to various electrical components to reduce and/or simplify the vehicle wiring. Bus bars within the power distribution boxes distribute power from one or two power input wires routed from the battery to many power output lines routed to the components, eliminating the need for wiring from the battery directly to each individual component.

Some power distribution boxes employ a secondary mechanism that locks to the housing of the power distribution box when terminals are matingly coupled to the bus bars are located in their correct position and are fully seated in the housing of the power distribution box. Some of these secondary mechanisms engage the terminals to hold them in the housing of the power distribution box.

In some instances, movement of wires that are coupled to the terminals can create stress on the terminals. Accordingly, there is a need in the art for an improved power distribution box assembly that reduces stress on the terminals of a power distribution box.

SUMMARY

This section provides a general summary of the disclosure, and is not a comprehensive disclosure of its full scope or all of its features.

In one form, the present teachings provide a power distribution box assembly having a power distribution box, a plurality of wire assemblies, a holder and a plurality of resilient fingers. The power distribution box has a housing, which defines a plurality of terminal cavities, and a plurality of conductive busbars. Each of the busbars terminates at a busbar terminal that is received in a corresponding one of the terminal cavities. Each wire assembly has a wire and a wire terminal. The wire includes a conductor and an insulating sheath disposed about the conductor. The wire terminal is coupled to the wire and electrically connected to the conductor. The wire terminal is received into an associated one of the terminal cavities and is engaged to a corresponding one of the busbar terminals such that the wire extends from a rear side of the housing. The holder is received in the rear side of the housing and is engaged to the housing in a snap-fit manner. The holder has a plurality of wire channels and a plurality of legs. Each of the wire channels receives an associated one of the wires. Each leg is abutted against a corresponding wire terminal and is configured to resist withdrawal of the corresponding wire terminal from the corresponding one of the busbar terminals. Each set of resilient fingers has at least one finger that is resiliently coupled to the holder and configured to engage an associated one of the wires.

In another form, the present teachings provide a power distribution box assembly having a power distribution box, a plurality of wire assemblies, a holder and a plurality of sets of resilient fingers. The power distribution box has a housing, which defines a plurality of terminal cavities, and a plurality of conductive busbars, each of which terminating at a busbar terminal that is received in a corresponding one of the terminal cavities. The wire assemblies are coupled to the busbar terminals and extend from a rear side of the housing. The holder is received in the rear side of the housing and engaged to the housing in a snap-fit manner. The holder has a plurality of wire channels, each of which receiving an associated one of the wires. Each set of resilient fingers has at least one finger that is resiliently coupled to the holder and configured to engage an associated one of the wires.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
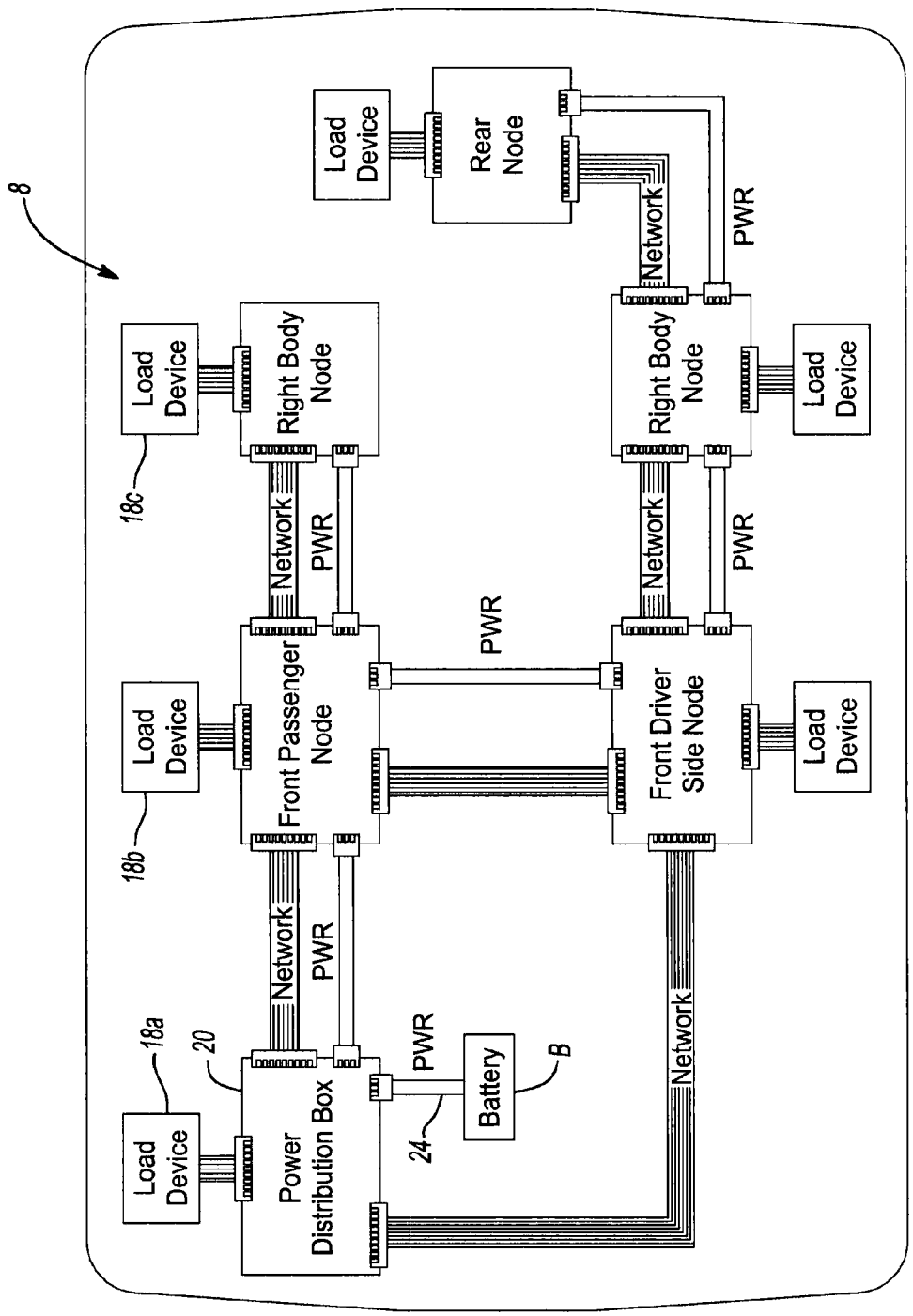
FIG. 1 is a schematic illustration of a power distribution box assembly constructed in accordance with the teachings of the present disclosure, the power distribution box assembly being integrated into a vehicle.
Figure 3:
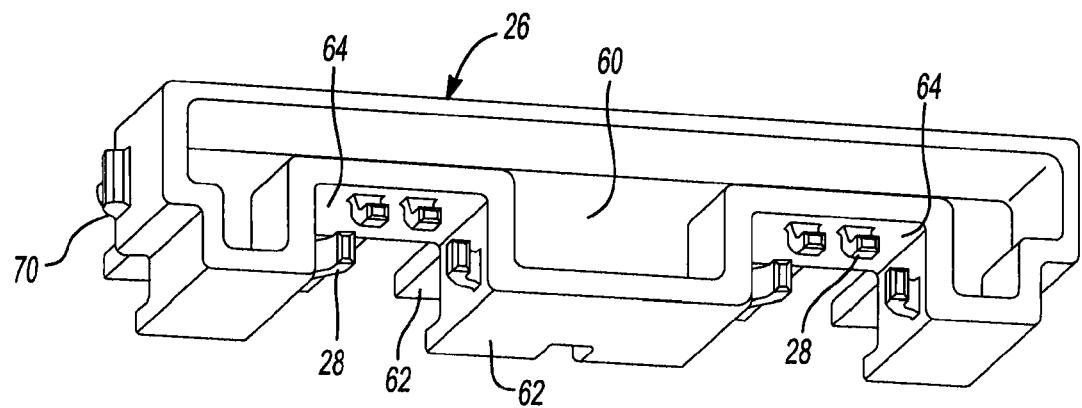
FIG. 3 is a perspective view of a portion of the power distribution box assembly of FIG. 1, illustrating a rear holder in more detail.

With reference to FIG. 1, a vehicle 8 is schematically illustrated and includes a power distribution box assembly 10 that is constructed in accordance with the teachings of the present disclosure. The vehicle 8 can also include a battery B and a plurality of load devices (e.g., load devices 18a, 18b and 18c), while the power distribution box assembly 10 can include a power distribution box 20, a wire harness 24, a rear holder 26 (FIG. 3) and a plurality of resilient fingers 28 (FIG. 3). The wire harness 24 can be configured to couple the battery B to the power distribution box 20, as well as the power distribution box 20 to the several load devices 18a, 18b, and 18c. The load devices 18a, 18b and 18c may be any type of electrically-powered device and may comprise common vehicle components such as motors, solenoids, fans, and/or compressors that may be continuously or selectively operated by a vehicle occupant, as through corresponding switches (not specifically shown). Although the example provided is illustrated and described as employing a plurality of switches to selectively control the operation of one or more load devices, it will be understood that the operation of the load devices may be controlled in response to the generation of any type of signal, whether manually or automatically generated.

Figure 2:
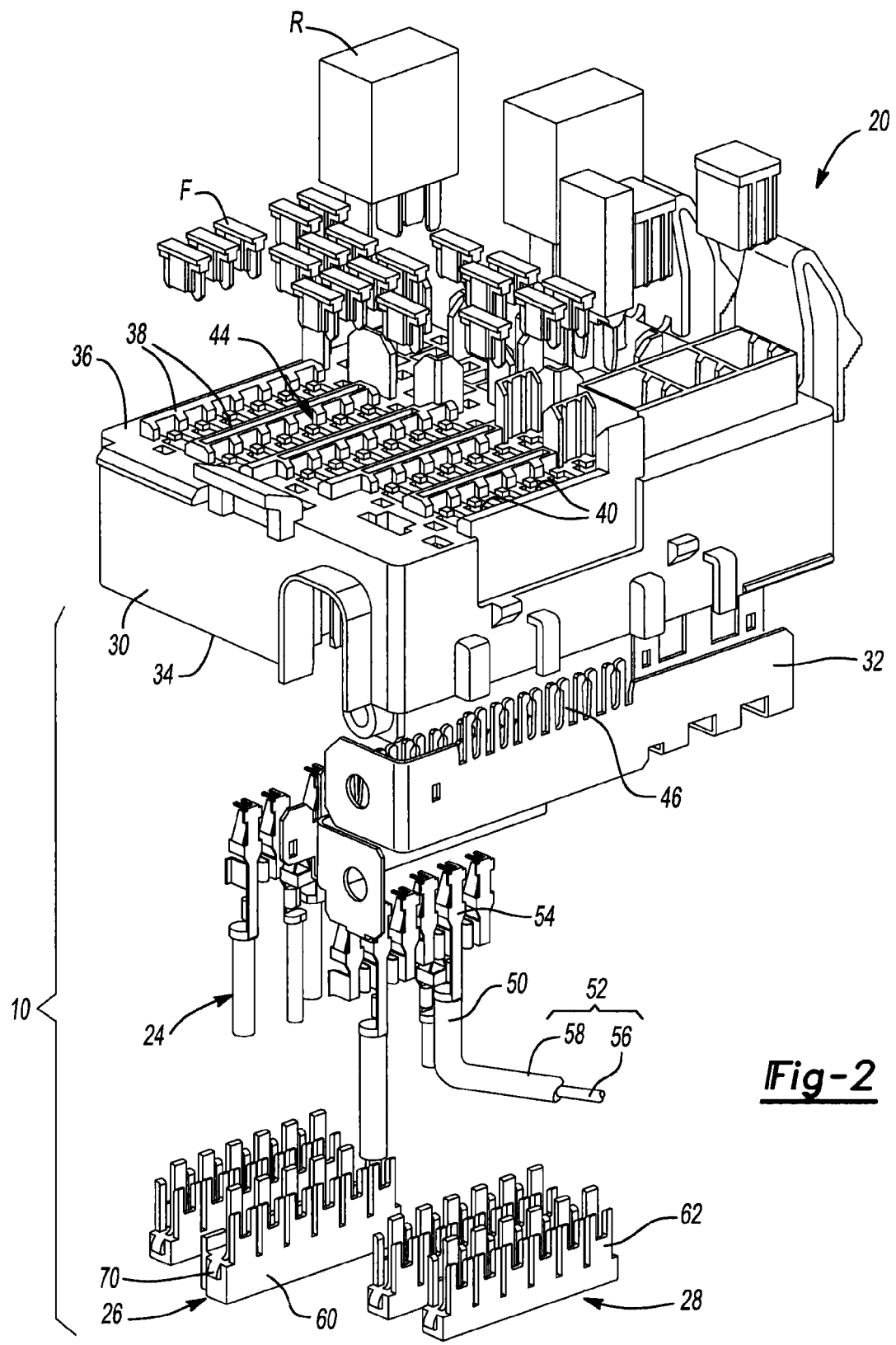
FIG. 2 is an exploded perspective view of the power distribution box assembly of Figure.

With reference to FIG. 2, a portion of the power distribution box assembly 10 is illustrated in more detail. The power distribution box 20 can comprise a housing 30 and one or more busbars 32. The housing 30 can have a front side 34 and a rear side 36 and can define one or more support walls 38 and a plurality of terminal cavities 40 that can extend between the front and rear sides 34 and 36. The support walls 38 can extend about the terminal cavities 40 and can be employed to form receptacles 44 that segregate sets of the terminal cavities 40 for connection to a desired device, such as the wire harness 24, a fuse F, a relay R or a switch (not shown). The housing 30 can be formed from an electrically insulating material and can be formed in any desired manner, such as by injection molding. The busbars 32 can be formed of a conductive material, such as copper sheet, in any desired manner, such as stamping, and can be fixedly coupled to the housing 30 in any desired manner. Each busbar 32 can have one or more busbar terminals 46 that can be received into an associated one of the terminal cavities 40 (e.g., through the front side 34 of the housing 30).

The wire harness 24 can comprise one or more wire assemblies 50 in which each wire assembly 50 can include a wire 52 and a wire terminal 54. The wire 52 can conventionally include a conductor 56 and an electrically insulating sheath 58 that can be disposed about the conductor 56. The wire terminal 54 can be mechanically coupled or fixed to the wire 52 and electrically coupled to the conductor 56. The wire assembly 50 can be received into an associated one of the terminal cavities 40 (e.g., through the rear side 36 of the housing 30) and can be electrically and mechanically engaged to a corresponding one of the busbar terminals 46.

With reference to FIGS. 2 and 3, the rear holder 26 can be configured to be received in the rear side 36 of the housing 30 into one of the receptacles 44 and fixedly coupled to the housing 30 to aid in securing various ones of the wire assemblies 50 to one or more of the busbars 32. The rear holder 26 can have a holder body 60 and a plurality of legs 62 that can extend from the holder body 60. The holder body 60 can define a plurality of wire channels 64 and can have a shape that is generally complementary to a given set of the receptacles 44 and the associated wire assemblies 50. The wire channels 64 can be configured to be aligned to the terminal cavities 40 when the rear holder 26 is fixedly coupled to the housing 30 so as to receive an associated one of the wires 52 therein. The legs 62 are positioned to abut one or more of the wire terminals 54 on a side opposite the busbar terminals 46 to thereby resist withdrawal of the wire terminals 54 from the busbar terminals 46 when the rear holder 26 is fully inserted and engaged to the housing 30.

Figure 4:
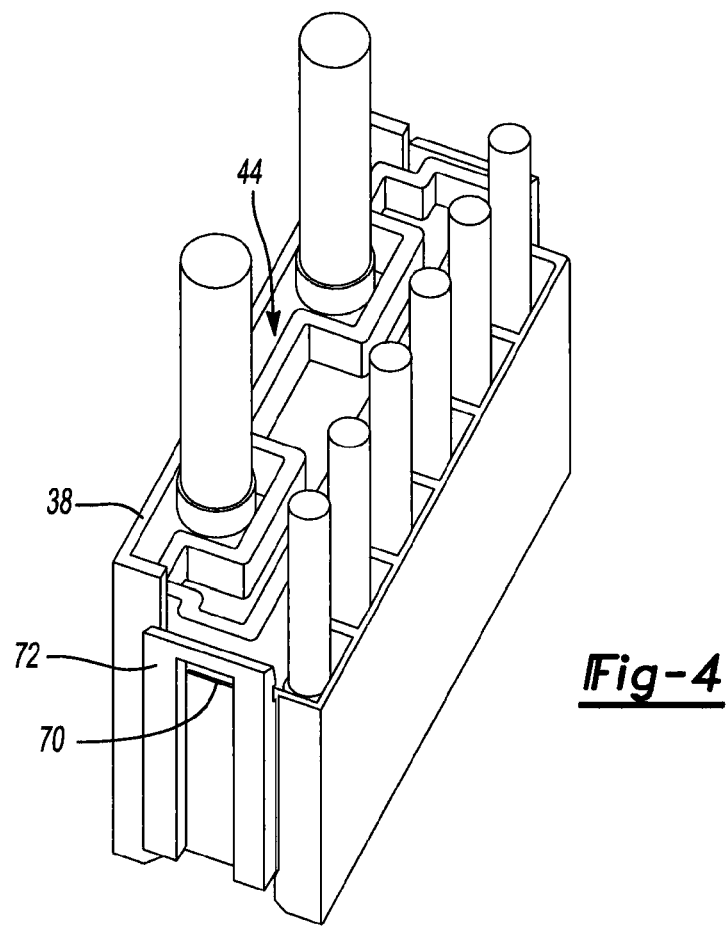
FIG. 4 is a perspective view of a portion of the power distribution box assembly illustrating the rear holder received in the housing of the power distribution box.

With reference to FIGS. 2 through 4, when the rear holder 26 is fully inserted to the housing 30 (i.e., when each of the wires 52 is received in an associated one of the wire channels 64 and the holder body 60 is received in a receptacle 44 such that the legs 62 are abutted against associated wire terminals 54 as shown in FIG. 4), snap lock features on the holder body 60 and the housing 30 can engage one another to fixedly (or fixedly but removably) couple the rear holder 26 to the housing 30. In the particular example provided, the rear holder 26 includes a pair of protrusions or tabs 70 that are received into corresponding recesses 70 formed in the housing 30. It will be appreciated that in situations where one of the wire assemblies 50 is incorrectly positioned relative to the housing 30, or where one or more of the wire assemblies 50 is not fully inserted into a corresponding one of the terminal cavities 40 (such that one or more of the wire terminals 54 is not fully engaged to a corresponding one of the busbar terminals 46), it will not be possible to fully insert the rear holder 26 to the housing 30, and consequently the snap lock features will not engage one another.

The resilient fingers 28 can be coupled to the holder body 60 at a location where they are engaged to associated ones of the wires 52. It will be appreciated that due to the resilient nature of the fingers 28, the fingers 28 can resiliently support the wires 52 so as to help control the way and amount that the wires 52 bend as they exit the power distribution box 20. For example, the resilient fingers 28 can be disposed in the wire channels 64. The resilient fingers 28 can be configured to support opposite sides of an associated one of the wires 52 (e.g., to center the associated wire 52 relative to a corresponding terminal cavity 40 along one or more axes, such as an axis of an associated one of the wire channels 64), and/or can be configured to urge an associated wire 52 into abutment with one or more support walls 38.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power distribution box assembly comprising:
a power distribution box having a housing and a plurality of conductive busbars, the housing defining a plurality of terminal cavities, each of the busbars terminating at a busbar terminal that is received in a corresponding one of the terminal cavities;
a plurality of wire assemblies, each wire assembly having a wire and a wire terminal, the wire comprising a conductor and an insulating sheath disposed about the conductor, the wire terminal being coupled to the wire and electrically connected to the conductor, the wire terminal being received into an associated one of the terminal cavities and engaged to a corresponding one of the busbar terminals such that the wire extends from a rear side of the housing;
a holder that is received in the rear side of the housing and engaged to the housing in a snap-fit manner, the holder having a plurality of wire channels and a plurality of legs, each of the wire channels receiving an associated one of the wires, each leg being abutted against a corresponding wire terminal and being configured to resist withdrawal of the corresponding wire terminal from the corresponding one of the busbar terminals, the holder being removable from the housing while the wire terminals are engaged to the busbar terminals; and
a plurality sets of resilient fingers, each set of resilient fingers having at least one finger that is resiliently coupled to the holder and configured to engage an associated one of the wires.

2. The power distribution box of claim 1, wherein at least a portion of the fingers are disposed in one or more of the wire channels.

3. The power distribution box of claim 1, wherein each finger is generally L-shaped.

4. The power distribution box of claim 1, wherein the housing defines one or more support walls, and wherein at least a portion of the fingers are configured to urge the wires into abutment with the one or more support walls.

5. The power distribution box of claim 1, wherein one of the sets of resilient fingers comprises two opposed fingers that cooperate to center the wire relative to the terminal cavity along one or more axes.

6. A power distribution box assembly comprising:
a power distribution box having a housing and a plurality of conductive busbars, the housing defining a plurality of terminal cavities, each of the busbars terminating at a busbar terminal that is received in a corresponding one of the terminal cavities;
a plurality of wire assemblies coupled to the busbar terminals and extending from a rear side of the housing;
a holder that is received in the rear side of the housing and engaged to the housing in a snap-fit manner, the holder having a plurality of wire channels, each of the wire channels receiving an associated one of the wires, the holder being removable from the housing while the wire terminals are engaged to the busbar terminals; and
a plurality sets of resilient fingers, each set of resilient fingers having at least one finger that is resiliently coupled to the holder and configured to engage an associated one of the wires.

7. The power distribution box of claim 6, wherein at least a portion of the fingers are disposed in one or more of the wire channels.

8. The power distribution box of claim 6, wherein each finger is generally L-shaped.

9. The power distribution box of claim 6, wherein the housing defines one or more support walls, and wherein at least a portion of the fingers are configured to urge the wires into abutment with the one or more support walls.

10. The power distribution box of claim 6, wherein one of the sets of resilient fingers comprises two opposed fingers that cooperate to center the wire relative to the terminal cavity along one or more axes.

11. A power distribution box assembly comprising:
a power distribution box having a housing and a plurality of conductive busbars, the housing defining a plurality of terminal cavities, each of the busbars terminating at a busbar terminal that is received in a corresponding one of the terminal cavities;
a plurality of wire assemblies, each wire assembly having a wire and a wire terminal, the wire comprising a conductor and an insulating sheath disposed about the conductor, the wire terminal being coupled to the wire and electrically connected to the conductor, the wire terminal being received into an associated one of the terminal cavities and engaged to a corresponding one of the busbar terminals such that the wire extends from a rear side of the housing;
a holder that is received in the rear side of the housing and engaged to the housing in a snap-fit manner, the holder having a plurality of wire channels and a plurality of legs, each of the wire channels receiving an associated one of the wires, each leg being abutted against a corresponding wire terminal and being configured to resist withdrawal of the corresponding wire terminal from the corresponding one of the busbar terminals, the holder being removable from the housing while the wire terminals are engaged to the busbar terminals; and
a plurality sets of resilient fingers, each set of resilient fingers having at least one finger that is resiliently coupled to the holder and configured to engage an associated one of the wires;
wherein at least a portion of the fingers are disposed in one or more of the wire channels, wherein each finger is generally L-shaped, wherein the housing defines one or more support walls, and wherein at least a portion of the fingers are configured to urge the wires into abutment with the one or more support walls and wherein one of the sets of resilient fingers comprises two opposed fingers that cooperate to center the wire relative to the terminal cavity along one or more axes.

* * * * *